W. T. SEARS.
DRILLING MACHINE.
APPLICATION FILED FEB. 3, 1917.
1,339,044.
Patented May 4, 1920.
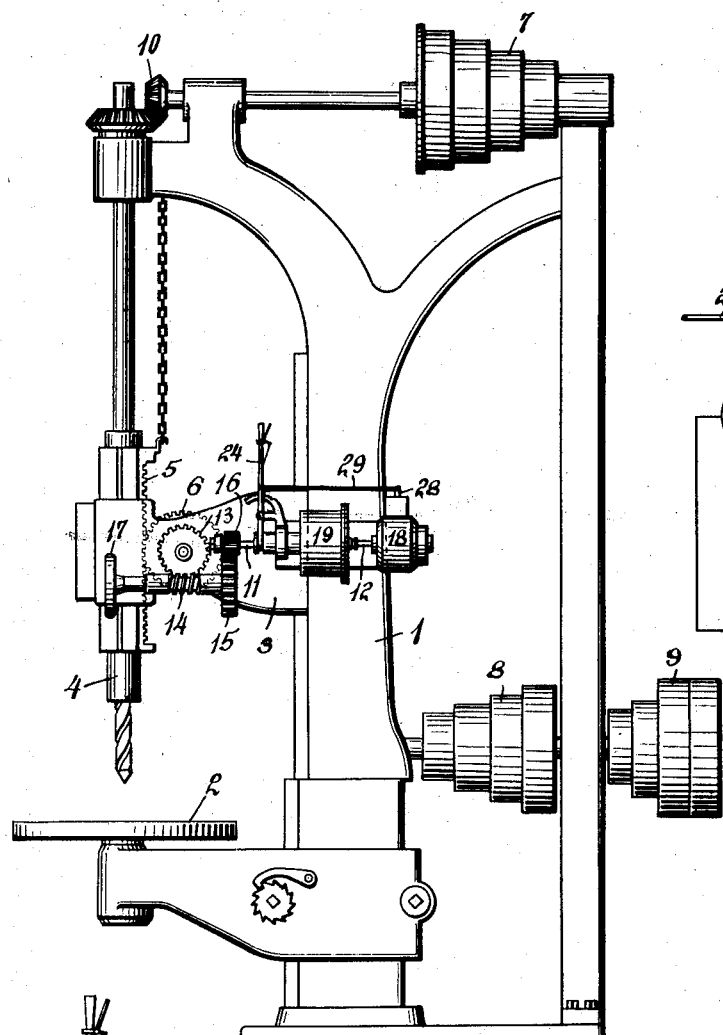
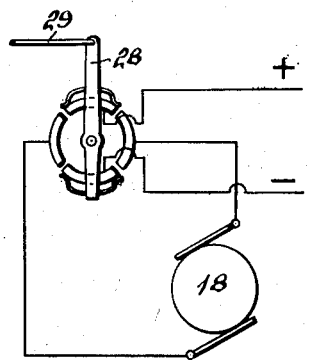
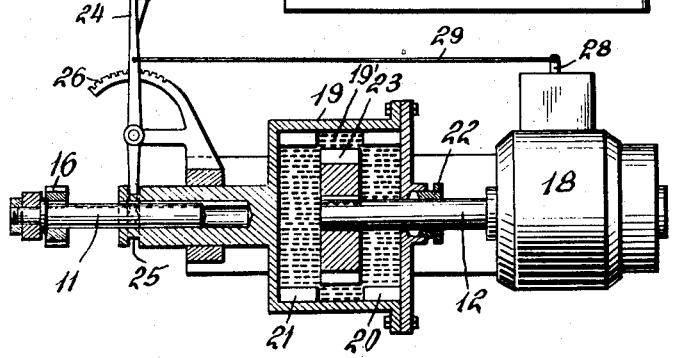
INVENTOR
Willard T. Sears
BY S. Jay Teller
ATTORNEY

UNITED STATES PATENT OFFICE.

WILLARD T. SEARS, OF PHILADELPHIA, PENNSYLVANIA, ASSIGNOR TO NILES-BEMENT-POND COMPANY, OF JERSEY CITY, NEW JERSEY, A CORPORATION OF NEW JERSEY.

DRILLING-MACHINE.

1,339,044. Specification of Letters Patent. Patented May 4, 1920.

Application filed February 3, 1917. Serial No. 146,398.

*To all whom it may concern:*

Be it known that I, WILLARD T. SEARS, a citizen of the United States, residing at Philadelphia, in the county of Philadelphia and State of Pennsylvania, have invented certain new and useful Improvements in Drilling-Machines, of which the following is a specification.

The invention relates particularly to feed mechanism for drilling machines, one of the objects of the invention being to provide a feed mechanism of novel character which is adapted to apply a substantially uniform feeding pressure notwithstanding variations in the speed or variations in the resistance to feeding.

Another object of the invention is to provide improved means whereby the feeding pressure can be changed at will.

Another object of the invention is to provide means whereby the device which supplies the power for feeding can be stopped, started or reversed as required, preferably simultaneously with its connection to or disconnection from the drill stem.

Other objects of the invention will be fully apparent from the following specification and the claims.

In the accompanying drawing I have shown one embodiment of the invention, but it will be understood that the invention can be embodied in other ways and that the construction shown is intended for illustrative purposes only and is not to be construed as defining or limiting the scope of the invention, the accompanying claims being relied upon for that purpose. Particularly it will be understood that the invention, as concerns some of its features, is not limited to a drilling machine of the type disclosed, and that it can be embodied in drilling machines of other types or even in machines adapted for other work but which have a cutting tool which is continuously fed with respect to the material acted upon.

Of the drawings:

Figure 1 is a side view of a drilling machine embodying the invention.

Fig. 2 is an enlarged detail view, partly in section, showing the essential parts of the feeding mechanism.

Fig. 3 is a diagram of electrical connections.

Referring to the drawing, 1 represents the main frame of the drilling machine, 2 represents a work supporting table carried by the frame, 3 represents a spindle head carried by the frame and preferably vertically adjustable thereon and 4 is a drill spindle rotatably mounted in the head 3 and vertically movable therein under the control of a rack 5, a gear wheel 6 and other mechanism to be described. Suitable means are provided for rotating the spindle 4, such means as shown being belt pulleys 7, 8, and 9. The pulleys 7 are connected with the spindle by means of the gearing 10.

The mechanism for feeding the drill spindle 4, that is, for moving it toward or away from the table 2, comprises two independently rotatable elements or shafts 11 and 12, the first of which is connected with the drill stem and the second of which is provided with power means for actuating it. In the construction illustrated there is provided a worm wheel 13 connected with the aforesaid gear 6 and meshing with a worm 14 on a horizontal shaft which carries a spur gear 15. This spur gear 15 meshes with a pinion 16 on the shaft 11. Preferably there is provided a hand wheel 17 on the shaft which carries the worm 14 and the gear 15. For rotating the shaft 12 there is preferably provided a motor which is operable independently of the main drive mechanism for the drill stem, and as illustrated, this is an electric motor 18 connected directly with the shaft 12. The motor is carried by a suitable bracket secured to the head 3 so as to be vertically movable with the head.

The shaft 12, being directly connected with the motor 18, rotates relatively rapidly, and the shaft 11, because of its connection with the slowly moving drill stem, rotates slowly. A suitable power transmission mechanism is interposed between the shaft 12 and the shaft 11, this mechanism being non-positive in character and adapted to transmit a torque which is substantially uniform for any given set of conditions. When I refer to a non-positive power transmitting mechanism, I mean one in which relative yielding or slipping between the driving and driven elements is permitted to an indefinite extent without interfering with or preventing the continuous transmission of torque. While I do not limit myself to any one form of power transmitting mechanism, I prefer to use a mechanism such as shown. This comprises two coöperating sets of rotatable blades connected respectively with the shaft 12 and with the shaft 11. These blades are surrounded by a housing containing oil or other suitable liquid, and the blades are or may be so related that when the blades connected with the shaft 12 are rotated a torque is transmitted to the blades connected with the shaft 11. In the embodiment shown there is provided a housing 19 which is connected for rotation with the shaft 11, but which is longitudinally movable thereon. The outer wall of the housing carries a set of inward projecting blades 20, and by preference there is also a second set of similar blades 21. The two sets of blades are spaced apart as shown. The shaft 12 being in alinement with the shaft 11, extends into the housing 19, the joint between the shaft and the wall of the housing being made tight by means of a stuffing box 22. Secured to the end of the shaft 12 is a set of outward projecting blades 23.

When the housing 19 with its blades is in its central position as shown, the blades 23 are opposite the space between the blades 20 and 21. Suitable means is provided for moving the housing 19 with its blades longitudinally, and, as shown, this means comprises a pivoted lever 24 which is forked at its lower end and provided with pins which engage a groove 25 in the hub of the housing 19. Preferably there is provided a notched quadrant 26 and a hand-controlled detent for locking the lever in any position to which it may be moved. It will be seen that by means of this lever 24 the housing 19 can be moved in either direction from the central position so as to cause the blades 20 or the blades 21 to be to a greater or less extent opposite the blades 23. Assuming the shaft 12 with the blades 23 to be rapidly rotating, it will be seen that in the central position shown, the action of the blades 23 will cause the oil with which they engage to move rotatively and also to move outward under the influence of centrifugal force, but as the space outside of the blades 23 is unobstructed by blades, such action of the oil will transmit little or no rotative tendency to the housing 19. If, however, the housing be moved in one direction or the other to bring either the blades 20 or the blades 21 to some extent opposite the rotating blades 23, the moving oil will impinge against these blades and tend to rotate them. For a given speed of the blades 23 the rotative tendency transmitted to the housing 19 will depend upon the extent to which it has been moved longitudinally from the position shown.

The housing 19 is not entirely filled with oil, whereby an air space 19′ is left therein. This air being compressible allows for the displacement of the oil by the shaft 12 which must necessarily take place when the housing 19 is moved to cause such shaft to enter the housing. During operation, the centrifugal force causes the oil to move away from the center of the housing whereby the air space will seek such center and therefore in no way interfere with the operation of the mechanism.

As already stated, the motion of the shaft 12 and of the blades 23 is relatively rapid, and the motion of the shaft 11 and the blades 20 and 21 is relatively slow, even when feeding is taking place at the maximum rate. Therefore the difference in rotative speed is always large and the result is that the rotative tendency or torque transmitted from the shaft 12 to the shaft 11 is substantially uniform for any given longitudinal position of the blades 20 and 21.

Preferably, in order that the drill stem may be withdrawn as well as fed forward, I provide for the reversal of the shaft 12. When the shaft is driven by an electric motor as shown, the motor itself is preferably reversed. In Fig. 3 I have shown the motor 18 connected through a reversing switch 28. As shown, the switch is in neutral position and the motor 18 is idle. If the switch be rotated in a clockwise direction the motor will be started in one direction, and it will be assumed that this is the direction for feeding. If the switch be rotated in a counter-clockwise direction, the motor will be started in the other direction, which will be assumed to be the direction for withdrawing the drill stem. Preferably, for the sake of simplicity and convenience, the switch 28 is connected with the lever 24 by means of a rod 29 or other suitable device.

In operation, let it be assumed that the parts are in the positions shown and that a piece of work to be drilled is in place on the table 2. The operator moves the lever 24 toward the right, thus simultaneously moving the switch 28 to start the motor in the proper direction and moving the blades 20 to a position partly opposite the blades 23. The motor immediately starts, and by means of the blades 23 causes oil to impinge against the blades 20, thus transmitting a torque to the housing 19 and the shaft 11. This torque is transmitted to the drill stem by means of the gearing described, with the result that the drill stem is pressed downward with a pressure which is definite and uniform for any given position of the blades 20. If the drill is initially some distance above the work its motion downward will first be quite rapid, but as the work is engaged, the feeding will take place at a rate depending on the pressure. The operator can vary the rate of feeding as desired by moving the lever 24 and thus increasing or decreasing the pressure. It will be understood that the pressure is uniform for any given position of the blades 20 and that therefore the rate of feeding will accommodate itself to the character of the work, there being no possibility of breaking the drill by excessive pressure thereon and no loss of time resulting from too slow feeding under insufficient pressure. When the hole has been drilled through the work or to a sufficient depth therein, the operator moves the lever 24 to its central position, thus gradually reducing the torque and the pressure and finally stopping the motor 18. By continuing the movement of the lever 24 toward the left, the motor 18 is reversed and the torque gradually increased, thus causing the drill stem to be withdrawn at the proper rate.

What I claim is:

1. In a drilling machine, the combination with a work support and a rotating drill stem, of feed mechanism comprising a power actuated element adapted to rotate rapidly during all feeds of the drill, a feed element connected with the drill stem and adapted to rotate slowly during all feeds of the drill, and non-positive mechanism interposed between the elements for transmitting a torque which is substantially uniform notwithstanding relative variations in the speeds of the elements, such mechanism operatively connecting the two elements in such manner as to provide a medium for transmitting a constant torque from the high speed element to the other element whereby the latter is normally rotated at a constant but slower speed, thus applying to the drill stem a feeding pressure which is substantially constant and uniform notwithstanding variations in the resistance offered by the work.

2. In a drilling machine, the combination with a work support and a rotating drill stem, of feed mechanism comprising a power actuated element adapted to rotate rapidly during all feeds of the drill, a feed element connected with the drill stem and adapted to rotate slowly during all feeds of the drill, non-positive mechanism interposed between the elements for transmitting a torque which is substantially uniform notwithstanding relative variations in the speeds of the elements, such mechanism operatively connecting the two elements in such manner as to provide a medium for transmitting a constant torque from the high speed element to the other element whereby the latter is normally rotated at a constant but slower speed, thus applying to the drill stem a feeding pressure which is substantially constant and uniform notwithstanding variations in the resistance offered by the work, and means for changing the said uniform torque thereby changing the said uniform pressure.

3. In a drilling machine, the combination with a work support and a rotating drill stem, of feed mechanism comprising a power actuated element adapted to rotate rapidly during all feeds of the drill, a feed element connected with the drill stem and adapted to rotate slowly during all feeds of the drill, adjustable non-positive mechanism interposed between the elements for transmitting a torque which is substantially uniform for a given adjustment notwithstanding relative variations in the speeds of the elements, such mechanism operatively connecting the two elements in such manner as to provide a medium for transmitting a constant torque from the high speed element to the other element whereby the latter is normally rotated at a constant but slower speed, thus applying to the drill stem a feeding pressure which is substantially constant and uniform notwithstanding variations in the resistance offered by the work, and means for gradually adjusting the transmitting mechanism to increase or decrease the said uniform torque and thereby increase or decrease the said uniform pressure.

4. In a drilling machine, the combination with a work support and a rotating drill stem, of feed mechanism comprising a rapidly rotatable power actuated element, a slowly rotatable feed element connected with the drill stem, adjustable non-positive mechanism between the elements adapted to transmit a torque which is substantially uniform for a given adjustment notwithstanding relative variations in the speeds, thus applying to the drill stem a feeding pressure which is substantially uniform notwithstanding variations in the resistance offered by the work, and a single means for simultaneously starting the power actuated element and adjusting the transmitting mechanism to start the transmission of torque.

5. In a drilling machine, the combination with a work support and a rotating drill stem, of feed mechanism comprising a power actuated element adapted to rotate rapidly during all feeds of the drill, a feed element connected with the drill stem and adapted to rotate slowly during all feeds of the drill, non-positive mechanism interposed between the elements for transmitting a torque which is substantially uniform notwithstanding relative variations in the speeds of the elements, such mechanism operatively connecting the two elements in such manner as to provide a medium for transmitting a constant torque from the high speed element to the other element whereby the latter is normally rotated at a constant but slower speed, thus applying to the drill stem a feeding pressure which is substantially constant and uniform notwithstanding variations in the resistance offered by the work, and manually controllable means for reversing the rotation of the power actuated element to cause the drill to be withdrawn.

6. In a drilling machine, the combination with a work support and a rotating drill stem, of feed mechanism comprising a rapidly rotatable power actuated element, a slowly rotatable feed element connected with the drill stem, adjustable non-positive mechanism between the elements for transmitting a torque which is substantially uniform for a given adjustment notwithstanding relative variations in the speeds, thus applying to the drill stem a feeding pressure which is substantially uniform notwithstanding variations in the resistance offered by the work, and means for simultaneously starting the power actuated element in either direction and adjusting the transmitting mechanism to start the transmission of torque.

7. In a drilling machine, the combination with a work support and a rotative drill stem, of feed mechanism comprising a rapidly rotatable power actuated element, a slowly rotatable feed element connected with the drill stem, adjustable non-positive mechanism between the elements for transmitting a torque which is substantially uniform for a given adjustment notwithstanding relative variations in the speeds, thus applying to the drill stem a feeding pressure which is substantially uniform notwithstanding variations in the resistance offered by the work, and means for simultaneously starting the power actuated element in either direction and adjusting the transmitting mechanism to start the transmission of torque or for simultaneously stopping the power actuated element and adjusting the transmitting mechanism to stop the transmission of torque.

8. In a drilling machine, the combination with a work support and a rotating drill stem, of feed mechanism comprising a rapidly rotatable power actuated element, a slowly rotatable feed element connected with the drill stem, adjustable non-positive mechanism between the elements for transmitting a torque which is substantially uniform for a given adjustment notwithstanding relative variations in the speeds, thus applying to the drill stem a feeding pressure which is substantially uniform notwithstanding variations in the resistance offered by the work, and a single lever for simultaneously starting the power actuated element and adjusting the transmitting mechanism to start the transmission of torque, the said element being rotated in one direction or the other according to the direction in which the lever is moved.

9. In a drilling machine, the combination with a work support and a rotating drill stem, of feed mechanism comprising a rapidly rotatable power actuated element, a slowly rotatable feed element connected with the drill stem, adjustable non-positive mechanism between the elements for transmitting a torque which is substantially uniform for a given adjustment notwithstanding relative variations in the speeds, thus applying to the drill stem a feeding pressure which is substantially uniform notwithstanding variations in the resistance offered by the work, and a single lever operable to simultaneously adjust the transmitting mechanism to start the transmission of torque and to start the power actuated element in one direction or the other according to the direction in which the lever is moved, the lever being also operable when returned to its original position to stop the transmission of torque and to stop the power actuated element.

10. In a drilling machine, the combination with a work support and a rotating drill stem, of feed mechanism comprising an electric motor rotatable independently of the rotation of the drill stem, a rapidly rotating power element driven by the motor, a slowly rotating feed element connected with the drill stem, and non-positive mechanism between the elements for transmitting a torque which is substantially uniform notwithstanding relative variations in the speeds, thus applying to the drill stem a feeding pressure which is substantially uniform notwithstanding variations in the resistance offered by the work.

11. In a drilling machine, the combination with a work support and a rotating drill stem, of feed mechanism comprising a rapidly rotating power actuated element, a slowly rotating feed element connected with the drill stem and a torque transmitting mechanism having a liquid filled housing and two sets of coöperating rotatable blades in the housing connected respectively with the said elements for transmitting a torque which is substantially uniform.

12. In a drilling machine, the combination with a work support and a rotating drill stem, of feed mechanism comprising a rapidly rotating power actuated element, a slowly rotating feed element connected with the drill stem and an adjustable torque transmitting mechanism having a liquid filled housing and two sets of coöperating rotatable blades in the housing connected respectively with the said elements for transmitting a torque which is substantially uniform for a given adjustment, and means for moving one set of blades axially with respect to the other to change the said uniform torque.

13. In a drilling machine, the combination with a work support and a rotating drill stem, of feed mechanism comprising a rapidly rotating power actuated element, a slowly rotating feed element connected with the drill stem and an adjustable torque transmitting mechanism having a liquid filled housing and two sets of coöperating rotatable blades in the housing connected respectively with the said elements for transmitting a torque which is substantially uniform for a given adjustment, and means for starting or stopping the power actuated element and simultaneously moving one set of blades axially with respect to the other to increase or decrease the torque.

14. In a drilling machine, the combination with a work support and a rotating drill stem, of feed mechanism comprising a rapidly rotatable power actuated element, a slowly rotatable feed element connected with the drill stem and an adjustable torque transmitting mechanism having a liquid filled housing and three sets of coöperating rotatable blades in the housing for transmitting a torque which is substantially uniform for a given adjustment, two of the sets being spaced apart axially and connected with one of the said elements and the other set being connected with the other of the said elements, and means for moving the last said set of blades relatively to the first said two sets of blades in either direction from a central neutral position and for starting the power actuated element in one direction or the other according to the direction in which the blades are moved.

In testimony whereof, I hereto affix my signature.

WILLARD T. SEARS.